Dec. 26, 1961　　　　A. C. REYNOLDS, JR　　　3,015,094
LIGHTED NUMERICAL TIME DISPLAY CLOCK
Filed Sept. 6, 1957　　　　　　　　　　　　8 Sheets-Sheet 1

INVENTOR.
Andrew Craig Reynolds, Jr.
BY
Atty

Dec. 26, 1961  A. C. REYNOLDS, JR  3,015,094
LIGHTED NUMERICAL TIME DISPLAY CLOCK
Filed Sept. 6, 1957  8 Sheets-Sheet 2

INVENTOR.
Andrew Craig Reynolds, Jr
BY
ATTY

Dec. 26, 1961    A. C. REYNOLDS, JR    3,015,094
LIGHTED NUMERICAL TIME DISPLAY CLOCK
Filed Sept. 6, 1957    8 Sheets-Sheet 5

INVENTOR.
Andrew Craig Reynolds, Jr.
BY

INVENTOR.
Andrew Craig Reynolds, Jr.
BY

Dec. 26, 1961  A. C. REYNOLDS, JR  3,015,094
LIGHTED NUMERICAL TIME DISPLAY CLOCK
Filed Sept. 6, 1957  8 Sheets-Sheet 8

INVENTOR.
Andrew Craig Reynolds, Jr.
BY

Atty

United States Patent Office 3,015,094
Patented Dec. 26, 1961

3,015,094
LIGHTED NUMERICAL TIME DISPLAY CLOCK
Andrew Craig Reynolds, Jr., Waterbury, Conn., assignor to General Time Corporation, New York, N.Y., a corporation of Delaware
Filed Sept. 6, 1957, Ser. No. 682,379
20 Claims. (Cl. 340—338)

The present invention relates in general to clocks, and in particular to clocks in which time is displayed by electric lamps successively illuminated in different patterns to show the numbers which make up numerical time expressions.

In lighted time display clocks of the type described, each digit of a numerically expressed time, e.g., the digits 1, 2, 4, and 5 in the time expression 12:45, must be displayed by energizing a large plurality of lamps in different ones of a relatively great number of combinations. To do this electrically has in the past required either a relatively great number of electric switches together with means for actuating those switches in different combinations as time passes, or a lesser number of switches, each of which has a plurality of contacts. Such arrangements necessitate complex wiring systems, consume large amounts of space, and leave high the chances of faulty operation through failure of one or more of a vast number of switch contacts to operate properly.

By improved contrast, it is the general aim of the present invention to bring forth a lighted time display clock in which a relatively small number of switch contacts are required, thus realizing a structure which is physically more compact and electrically simplified in its wiring requirements, as well as making the operation of the circuitry highly reliable.

It is a related object of the invention to provide a lighted time display clock in which a large number of lamps can be energized in any of a plurality of combinations representative of numerical digits by virtue of electrical circuit connections selectively established in part through switch contacts actuated according to time by a horologic device, and in part through unidirectionally conductive devices, with the result that each switch contact may produce energization of a unique combination of lamps.

Another object of the invention is to provide such an electric lighted time display clock in which different combinations of a plurality of lamps are selectively energized by relatively few switches, and yet in which the number of unidirectionally conducting devices employed is relatively small owing to an arrangement for normally lighting certain ones of the lamps and selectively deenergizing them by shunting in response to closure of one or more of the switches, and by making certain others of the lamps normally deenergized but lighting them in response to closure of one or more of certain others of the switches.

Other objects and advantages will become apparent as the following description proceeds, taken in conjunction with the accompanying drawings, in which:

FIG. 8 is a side elevation illustrating the solenoid ratchet drive for the drum assembly, such view being taken substantially along the line 8—8 in FIG. 5;

While the invention has been shown and will be described in some detail with reference to a particular embodiment thereof, there is no intention to thus limit it to such details. On the contrary, it is intended here to cover all alterations, modifications, and equivalents falling in the spirit and scope of the invention as defined by the appended claims.

Figure 1:
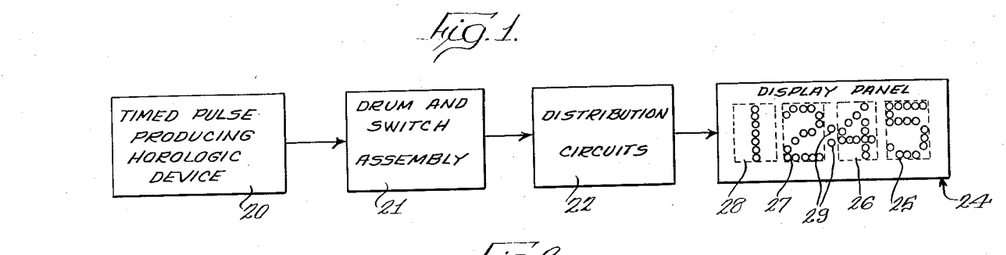
FIGURE 1 is a schematic block diagram showing the general organization of a lighted time display clock embodying the present invention.

Referring now to FIG. 1, the exemplary lighted display clock here illustrated as embodying the invention comprises in its general organization a source of timed electric pulses such as a horologic device 20 adapted to produce one pulse each minute. The device 20 may take a variety of forms known in the art. For example, a synchronous motor energized by a constant-frequency A.-C. voltage may be connected to drive a cam through suitable reduction gears, the cam being arranged to actuate a set of electrical contacts one time during each passing minute. The timed pulses from the device 20 are supplied to a drum and switch assembly 21 which includes a plurality of switches together with means for actuating such switches in a predetermined manner according to the time which is represented by the number of pulses received from the device 20. Those switches, to be described later in detail, are suitably connected in distribution circuits 22, illustrated in block form in FIG. 1, which serve to energize in various combinations a plurality of lamps mounted on a display board 24 and segregated into four display panels 25–28.

The display panel 25 is intended to show, by the lighting of different combinations of lamps therein, the particular number or digit in the first order of the minute value of numerically expressed time. In like manner, the display panel 26 shows the particular number or digit in the second order of a minute value, while the panels 27 and 28 display the digits for first and second orders of the hour value. For convenience, the respective panels 25–28 will be referred to hereinafter as panels for displaying "minutes-units," "minutes-tens," "hours-units," and "hours-tens," since the first and second orders of decimally expressed numerical time have units and tens multipliers.

Figure 2:
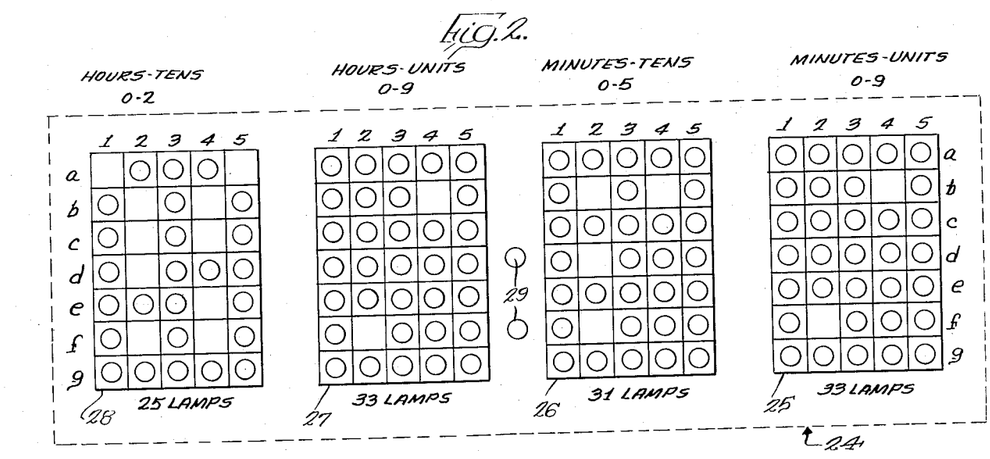
FIG. 2 is an illustration of a time display board, showing the number and location of lamps arranged in grid-like patterns of four display panels for respectively representing minutes-units digits 0–9, minutes-tens digits 0–5, hours-units digits 0–9, and hours-tens digits 0–2.

It will be observed that two vertically spaced lamps 29 are located on the board 24 between the panels 26 and 27, these lamps being permanently lighted to display a colon between the hour and minute values of the numerically expressed and displayed time.

As the timed pulses are received from the horologic device 20, the switch and drum assembly 21 is conditioned such that the switches therein successively establish different connections in the distribution circuits 22, and the latter thus successively energize lamps on the display board 24 so that each minute the displayed value of time is changed to properly represent the actual time.

The display panels 25–28 are illustrated in more detail by FIG. 2 in order to make clear the number and relative positions of the several lamps employed in each. The minutes-units display panel 25 is required to display any number or digit between 0 and 9 inclusive, and this is made possible, in the present instance, by disposing thirty-three lamps in a generally rectangular group pattern, the lamps being represented in FIG. 2 by small circles. Preferably, the grid patern is a rectangular array having five vertical columns (numbered 1–5 from left to right) and seven horizontal rows (lettered a–g from top to bottom). Reference to any particular lamp may thus hereinafter be made by designation of column and row. Because with the lamps arranged in a grid pattern as shown for the display panel 25, any numerical digit between zero and nine, respectively, can be represented by energizing different combinations of thirty-three lamps and without requiring a lamp to be energized in the locations $b4$ and $f2$, none of the thirty-three lamps is disposed in those particular locations.

The display panel 26 is organized and arranged substantially identically with the display panel 25. However, since the minutes-tens display panels 26 need show by illumination of the lamps therein only the numerical digits 0–5, inclusive, because the maximum number of minutes which need be represented is 59, only thirty-one lamps are required. It has been found possible to display the numbers 0–5 inclusive, in a 5 x 7 array of lamps without the necessity of having a lighted lamp in the locations $b2$, $b4$, $d2$, or $f2$, so that none of the thirty-one lamps in the panel 26 is disposed in those particular locations.

The display panel 27 contains thirty-three lamps and is arranged identically with the display panel 25. It will be understood that since the value of hours in numerically expressed time may have a units value of any digit between 0 and 9, the panel 27 is called upon to selectively display any one of those digits.

The display panel 28, as illustrated in FIG. 2, is here arranged to show the hours-tens digits of numerically expressed time which, instead of repeating each 12 hours, is expressed in the full value of hours up to 23 hours and 59 minutes. While the invention is applicable to a lighted display clock which repeats a cycle each 12 hours and thus displays a maximum of 11 hours and 59 minutes, the panel 28 in the present instance is arranged and controlled to display one of the digits 0, 1 or 2 which will be required to represent the hours-tens values for time expressed over a 24-hour period. Since the panel 28 need display any one of the three digits 0, 1 or 2, it has been found that only twenty-five lamps are required for a 5 x 7 rectangular array. To selectively display these three digits, no lamp is ever required to be lighted in the $a1$, $a5$, $b2$, $b4$, $c2$, $c4$, $d2$, $e4$, $f2$, and $f4$ locations of the grid pattern, and accordingly none of the twenty-five lamps is disposed in those particular locations.

Figure 3:
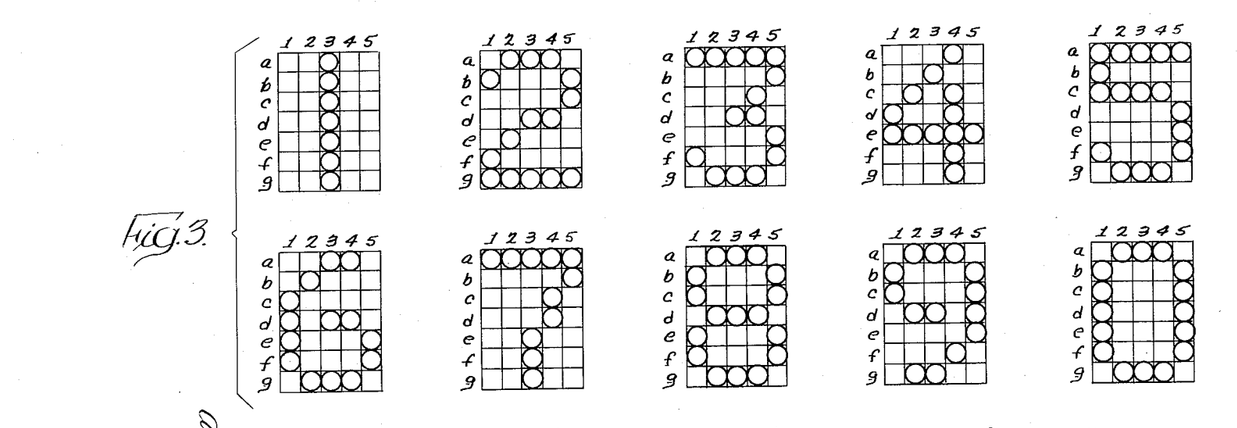
FIG. 3 illustrates the locations in a 5 x 7 grid pattern of the lamps of different combinations which are lighted to display the numerical digits 0–9 respectively.
Figure 4:
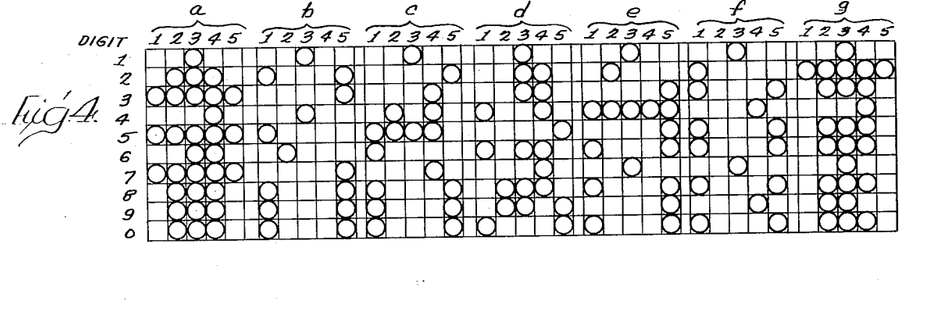
FIG. 4 is a chart which shows by identifying column numbers and row letters the locations of the particular lamps in a 5 x 7 grid pattern which must be lighted to display any numerical digit 0–9.

FIGS. 3 and 4 illustrate the particular combinations of lamps in a 5 x 7 rectangular grid pattern which need be lighted in order to display the respective numerical digits 0–9 inclusive. Since these figures are largely self-explanatory, it will only be necessary to refer to one specific example in order to make it clear as to what particular combination of lamps need be energized to display any given numerical digit. Taking the numeral "3" as shown in FIG. 3, it will be seen that in the "$a$" row of the 5 x 7 rectangular group pattern, the lamps in columns 1–5, inclusive, must be illuminated. Likewise, in row "$b$," only the lamp in column 5 need be illuminated. In rows "$c$" and "$d$" the lamp in column 4, and the lamp in columns 3 and 4 respectively, must be lighted. Further, in the "$e$" row, only the lamp in column 5 need be lighted; while in the "$f$" row, the lamps in columns 1 and 5 must be lighted. Finally, in the row "$g$" the lamps in columns 2, 3 and 4 must be lighted.

Turning attention now to FIG. 4, it will be seen that the chart there illustrated quickly shows which particular lamps in a 5 x 7 grid pattern must be illuminated to display any one of the numerical digits 0–9 inclusive. It will be seen by referring to the horizontal row in FIG. 4 opposite the digit "3" that the lamps to be lighted in the locations necessary to display the number "3" may be determined by reading horizontally across the chart.

Figures 5, 6, 7:
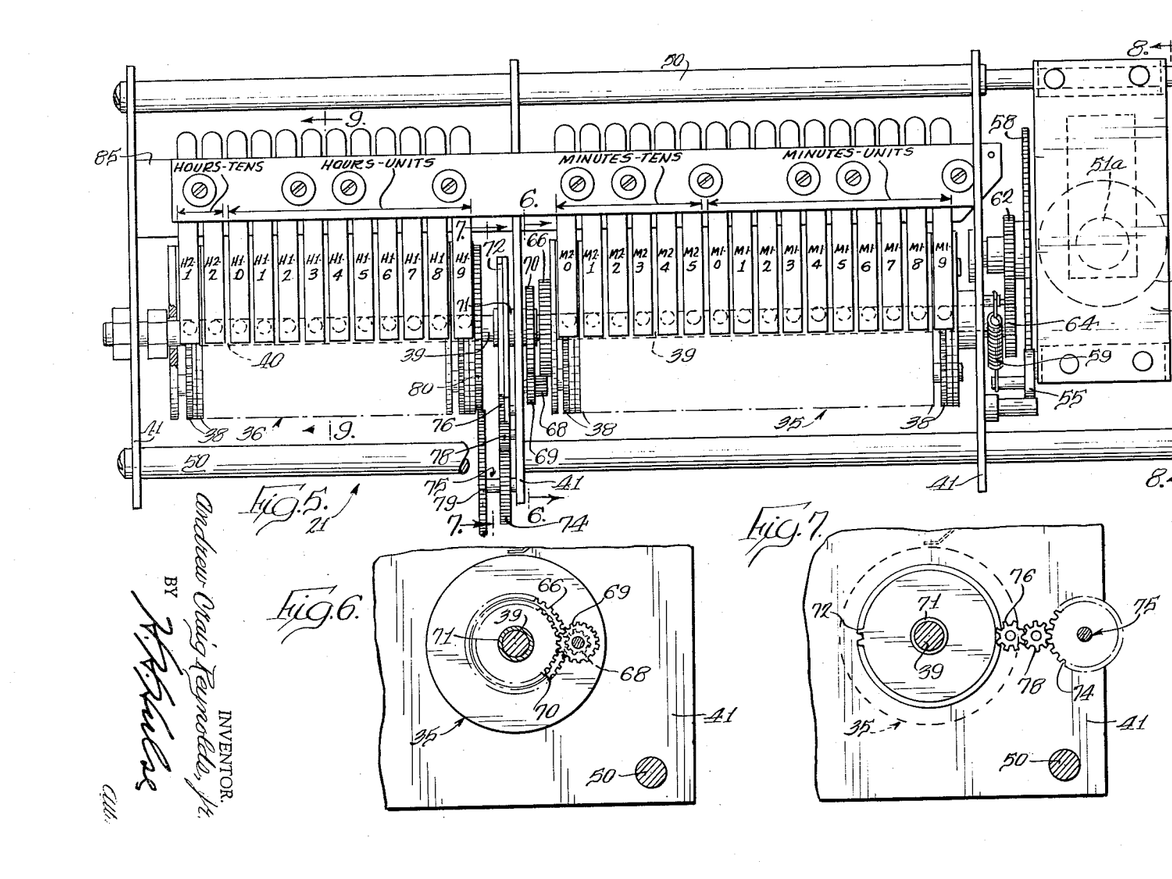
FIG. 5 is a plan view of a rotatable drum assembly and switches controlled thereby.
FIGS. 6 and 7 are detail views of speed reduction drive means, such views being taken substantially along the lines 6—6 and 7—7 respectively, in FIG. 5.
Figure 6:
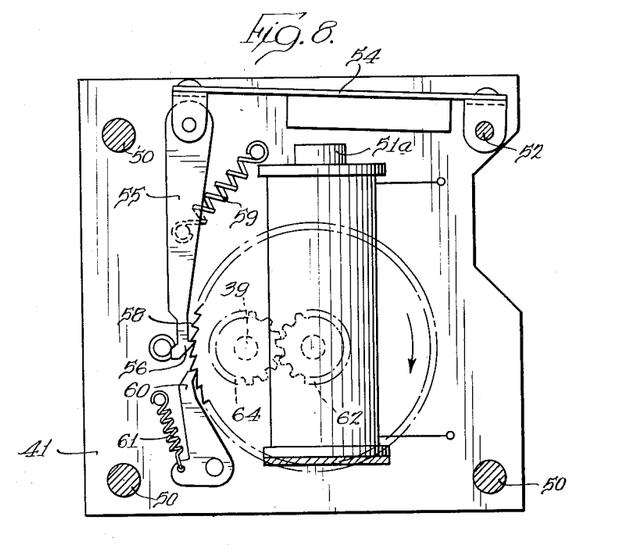

In carrying out the invention, a total of only twenty-eight switches are required for a clock which displays time to the nearest minute throughout each 24-hour interval. As shown in the plan view of FIG. 5, a first group of ten switches are provided to control the illumination of lamps in the minutes-units display panel 25. These ten switches are each assigned to one of the numerical digits 0–9 inclusive, and thus each may be identified as a minutes-units switch by the prefix M1 and a suffix indicative of the particular digit to which it is assigned. As shown in FIG. 5, these ten minutes-units switches may be designated by the reference characters M1–0 to M1–9.

A second group of six switches is provided for controlling the illumination of different combinations of lamps in the minutes-tens display panel 26, each of these switches being assigned one of the digit values 0–5 respectively. This second group of six switches is shown in FIG. 5, being designated by the reference characters M2–0 to M2–5, the prefix "M2" designating that they are for controlling the display of second order minutes numbers, and the suffixes indicating the particular number to which each of the respective switches is assigned.

A third group of ten switches is also provided for controlling the illumination of lamps on the hours-units of panel 27 so that any digit between zero and 9 may be displayed. The ten switches in this third group are labeled in FIG. 5 by the reference characters H1–0 through H1–9, the prefix of "H1" designating that the control, the display of numbers in the first order digit place of an hours expression, and the numerical suffixes 0–9 indicating the particular numerical digit to which each switch is assigned.

Finally, a fourth group of two switches is provided as shown in FIG. 5 for controlling the illumination of different combinations of lamps in the hours-tens display panel 28. These two switches are assigned the digit values "1" and "2," respectively, and are designated as second order hour switches by the reference characters H2–1 and H2–2.

Means are provided for individually actuating or closing the particular switch of each of the four groups which corresponds to the number in the associated digit place of numerically expressed time. That is, if at a given instant, the time reading should be 18:24 (indicative of 6:24 p.m.), the second order hour switch H2–1, the first order hour switch H1–8, the second order minute switch M2–2 and the first order minute switch M1–4 will be closed. In the present instance, this is accomplished by the drum assembly 21, having means to turn the same uniformly as time passes, and means for actuating the proper one switch in each of the four groups according to the angular position of the drum which represents time.

As here illustrated, the drum assembly 21 includes first and second drums 35 and 36 which may be respectively designated as the "minute" and "hour" drums. Each drum is made up of a plurality of disks 38 mounted fast on respective shafts 39 and 40, which are supported and journaled for rotation in three brackets 41 rigidly held together by spacing rods 50. It will be apparent from FIG. 5 that one radially notched disk is disposed immediately beneath each of the twenty-eight switches, ten disks on the minute drum 35 being respectively disposed opposite the minutes-units switches M1–0—M1–9 and six disks being disposed opposite the minutes-tens switches M2–0—M2–5. In like manner, ten disks on the hour drum 36 are disposed opposite the rigidly supported hours-units switches H1–0—H1–9, while the two remaining disks on that drum are disposed opposite the rigidly mounted hours-tens switches H2–1, H2–2.

In the present instance, means are provided for turning the minute drum 35 at a rate of one revolution per hour, and specifically in angular steps of $\frac{1}{60}$ of a revolution per minute. For this purpose, a solenoid 51 is mounted at the right end of the drum assembly, having an armature 51a which is moved upwardly each time that a current pulse is supplied to the solenoid. This solenoid receives the timed pulses produced each minute, as previously explained, by the horologic device 20 shown in FIG. 1. In response to each energization of the solenoid, the armature strikes and rocks upwardly about a pivot 52, a lever 54 which pivotally carries at one end a depending arm 55 having a pawl tooth 56 biased into engagement with a toothed wheel 58 by a spring 59. The toothed wheel 58 may be provided with sixty teeth thereon so that each time the lever 54 is lifted by the armature 51a, the pawl tooth 56 is raised and rotates that toothed wheel $\frac{1}{60}$ of one revolution. A toothed ratchet lever 60 engages the peripheral teeth of the wheel 58 under the biasing influence of the spring 61, permitting the wheel to rotate clockwise as viewed in FIG. 8 but locking it against reverse rotation.

Carried integrally by the toothed wheel 58 is a pinion 62 meshing with a mating gear 64 fast on the shaft 39 of the hour drum 35. The gears 62 and 64 are sized to provide a one-to-one drive ratio so that the drum 35 is rotated $\frac{1}{60}$ of a revolution each time that the pulse is supplied to the solenoid 62, i.e., at a rate of one revolution per hour.

In order to turn the hour drum 36 at a rate of one revolution per day, or $\frac{1}{24}$ of a revolution per hour, it is driven from the first drum 35 through speed-reduction means. Such means here comprise a drive gear 66 mounted rigidly on a left end of the drum 35 to rotate therewith, such gear meshing with a pinion 68 formed integrally with a larger gear 69, which in turn meshes with a gear 70 rigid with a sleeve 71 supported for relative rotation on the drum shaft extending through the middle bracket 41. On the opposite end of the sleeve 71 is rigidly fixed an intermittent or Geneva type gear 72 which drives the smaller gear 74 of a couplet 75 through a pinion 76 and an idler gear 78. The couplet 75 includes a pinion 79 larger in diameter than the gear 74 which drivingly meshes with a large gear 80 rigidly fixed to the right end of the drum 36. By way of example, the drive gear 66 may have sixty teeth while the mating pinion 68 may have twenty teeth, so that with the drum 35 rotating at one revolution per hour, the gears 68 and 69 rotate at three revolutions per hour. The gear 69 may be constructed with thirty-two teeth, and its mating gear 70 with forty-eight teeth so that the sleeve 71 and the Geneva gear 72 are thus driven at two revolutions per hour. The Geneva gear 72 may have a diameter and circumference sufficient to allow for sixty teeth thereon, but in the present instance is provided with only two teeth for greater speed reduction. In the illustrated example, the gear 76 may have eight teeth thereon, so that with the Geneva gear rotating at two revolutions per hour the small pinion 76 will be turned at a rate of one-half revolution per hour. The idler gear 78 may also have eight teeth so that it simply reverses the direction of rotation, turning at one-half revolution per hour. Further, the smaller gear 74 of the couplet 75 may have forty-eight teeth, so that the couplet and the larger gear 79 thereof are driven from the idler gear 78 at a rate of $\frac{1}{12}$ revolution per hour. Finally, the couplet gear 79 may be provided with twenty-four teeth, and the final output gear 80 rigid with the drum 36 provided with forty-eight teeth, so that with the gear 79 turning at $\frac{1}{12}$ revolution per hour, the hour drum 36 will rotate at a rate of $\frac{1}{24}$ revolution per hour. Since the solenoid 51 creates a stepping action, the hour drum 36 will step $\frac{1}{24}$ of a revolution each hour, or a rate of one revolution per day.

To individually actuate the switches in each of the four groups according to the time value represented by the angular positions of the drums 35 and 36, each of the switches is rigidly mounted on a bracket 85 disposed above and rearwardly of the drums, and each of the disks 38 disposed opposite one of the switches is provided with radial projections for physically engaging and actuating the corresponding switch when the drums are in particular angular positions or ranges of angular positions. For this purpose, each of the individual disks 38 is made up of three wafers as disclosed in the copending application of Michael Juhas, Serial No. 658,451, filed May 10, 1957, now Patent No. 2,917,519, and assigned to the assignee of the present invention. Briefly, each of the disks is made up of the backing wafer 38a, a smaller diameter spacing wafer 38b (FIG. 10), and a slotted wafer 38c which has a plurality of radial slots 38d in its periphery. Rotatably disposed between the disks 38c and 38a is a locking ring 38e having one radial slot 38f or opening therethrough. Thus, a switch-actuating dog 86 which is formed in the general shape of an L may be inserted into any one of the radial slots 38d of the disk 38c when the single slot or opening 38f in the locking ring 38e is alined. Rotation of the locking ring 38e then locks the L-shaped dog 86 in place.

Figures 9, 10:
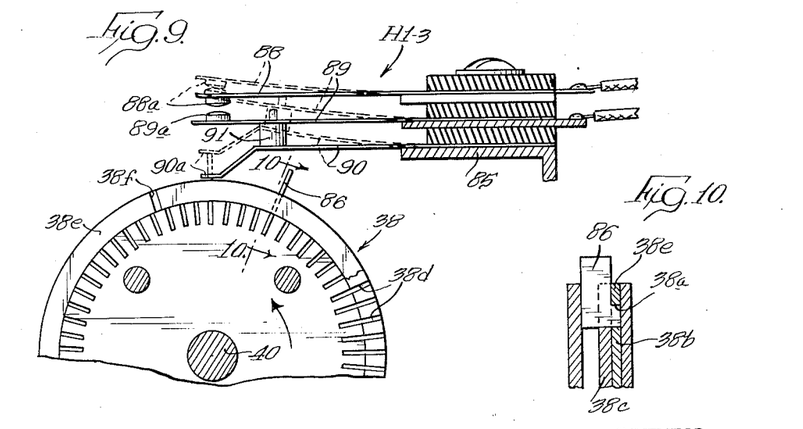
FIG. 9 is a fragmentary sectional view taken substantially along the line 9—9 in FIG. 5 and illustrating the structure for selectively actuating a typical switch.
FIG. 10 is a detail view taken in section substantially along the line 10—10 in FIG. 9.

Referring to FIG. 9, it will be seen that each of the switches, all of which are identical in construction, comprise two spaced and insulated yieldable spring leaves 88 and 89 which carry electrical contact points 88a and 89a in opposed, normally spaced relation. A third spring arm 90 is located immediately beneath the contact arm 89 and provided with an inclined finger 90a which is disposed adjacent to and immediately above the associated disk 38. Thus it will be seen from FIG. 10 that as the disk 38 rotates clockwise and reaches a predetermined angular position, the dog 86 will engage the finger 90a and deflect the spring arm 90 upwardly as indicated by dashed lines. Accordingly, a spacer member 91 interposed between the arms 90 and 89 will deflect the latter arm upwardly until the contacts 88a, 89a close. Overtravel is permitted by upward deflection of the leaf spring arm 88. Thus, by positioning one or more radially projecting dogs on each of the disks 38, the particular switch associated therewith may be actuated or closed whenever that disk is in predetermined angular positions.

Figure 11A:
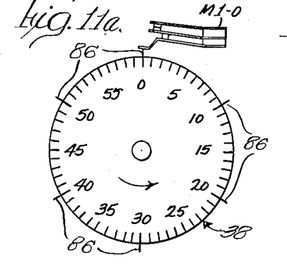
FIGS. 11a–11c illustrate the locations of actuating dogs on exemplary disks of the drum assembly for controlling the minutes-units switches.
Figure 11B:
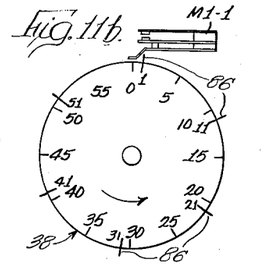
Figure 11C:
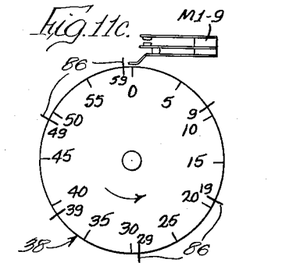

FIGS. 11a–11c illustrate typical locations of dogs 86 on the disks 38 of the drum 35 associated with the first group of switches M1–0 through M1–9 in a manner to successively actuate the switches during each minute of each successive ten-minute interval. That is, the switch-actuated dogs 86 are positioned such that the particular switch of the first group corresponding to a given digit number is actuated and closed when the angular position of the minutes drum 35 indicates that the time reading has a first order minutes value corresponding to the digit assigned to that particular switch. Thus, as shown in FIG. 11a, the first order minutes switch M1–0 which is assigned the zero digit value is disposed opposite a disk 38 on the drum 35 which carries six dogs 86, those dogs being located in radial slots which will place them in a position to actuate the switch when the drum is in angular positions representing minute time values of 0, 10, 20, 30, 40, and 50. This is illustrated in FIG. 11a where indicia are applied to the disk 38 to indicate the peripheral portion thereof which will be located at the top of the drum when the angular position of the latter reflects the indicated minute values for a time reading.

In like manner as shown in FIG. 11b, the drum disk 38, disposed opposite the first order minutes switch M1–1 assigned the digit value of "1," carries six dogs 86 located in radial slots which will produce actuation of the switch each time that the indicated time reading is 1 minute, 11 minutes, 21 minutes, 31 minutes, 41 minutes or 51 minutes. FIG. 11c illustrates the same pattern for locating six dogs 86 on the disk 38 disposed opposite the first order minute switch M1–9 assigned the digit value 9. It will be seen that these six dogs will result in closure of the switch M1–9 whenever the time reading reflected by the angular position of the drum 35 is 9 minutes, 19 minutes, 29 minutes, 39 minutes, 49 minutes or 59 minutes. It will be understood that the dogs are located in the disks associated with the other first order minute switches in a similar manner so that one of the ten minutes-units switches is at all times closed, the value assigned to that particular switch reflecting the value of the first order minutes digit of a time reading reflected by the angular position of the drum 35.

Figure 12A:
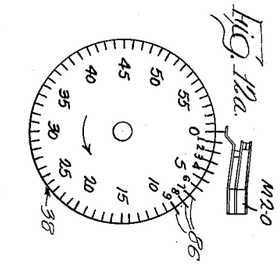
FIGS. 12a–12c illustrate the locations of switch-actuating dogs on exemplary disks of the drum assembly for controlling the minutes-tens switches.
Figure 12B:
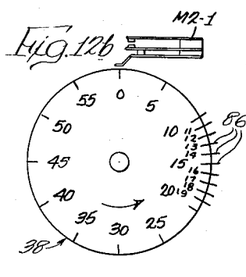
Figure 12C:
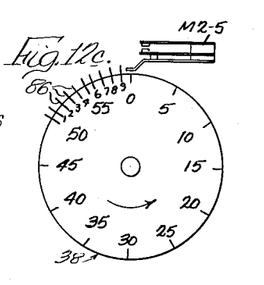

FIGS. 12a–12c illustrate the manner in which switch-actuating dogs 86 are located on the disks 38 associated with the second group of six switches M2–0 to M2–5 in order to successively actuate different ones of the switches during each ten minute interval of succeeding hours. Briefly, dogs are located on these particular disks such that one of the six switches is always closed, that particular switch which is closed being assigned to the digit value which reflects the second order digit or "tens" digit of a minute time reading reflected by the angular position of the drum 35. For example, as shown in FIG. 12a, the second order minute switch M2–0 assigned to the digit value of zero, is provided with ten dogs 86 thereon located in radial slots which will cause those dogs to actuate the switch when the drum 35 is in the anguuar positions reflecting a minute time value between zero minutes and nine minutes. Under these circumstances, the second order digit value of the time reading is zero, and accordingly the switch M2–0 will be actuated. As shown in FIG. 12b, the second order minutes switch assigned to digit value "1" is disposed opposite the disk 38 which carries ten dogs 86 located in radial notches corresponding to time values of ten through nineteen minutes. Thus, during this interval of time readings, when the second order value of the minutes expression is "1," the switch M2–1 will be actuated and closed. Further by way of example, illustrated in FIG. 12c, the second order switch M2–5, assigned the digit value of "5," is disposed opposite a disk 38 carrying ten dogs 86 peripherally located in positions corresponding to minute time readings of 50 through 59 minutes. Accordingly, this switch M2–5 will be closed whenever the second order digit of a minutes expression has the value of "5." The same general arrangement is employed for the second order minute switches M2–2, M2–3, M2–4.

Figure 13A:
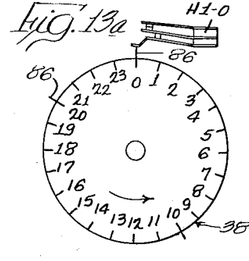
FIGS. 13a–13c illustrate the locations of switch actuating dogs on exemplary disks of the drum assembly for controlling the hours-units switches.
Figure 13B:
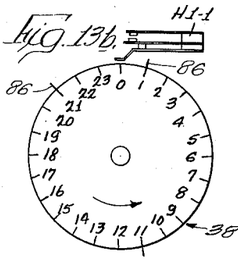
Figure 13C:
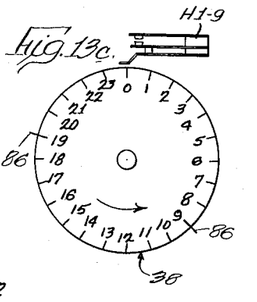

As to the third group of switches H1–0 through H1–9, means are provided to successively actuate a different one of such switches during each hour of two succeeding ten hour intervals and for respectively actuating the first four of the switches during the succeeding four hour interval. For this purpose the disks 38 associated with the switches H1–0—H1–9 on the drum 36 are provided with 24 radial notches or slots equally spaced about their circumference. The value of time in hours reflected by the angular position of the drum 36 and its disks is illustrated in FIGS. 13a through 13c. These figures also make it clear that dogs 86 are disposed on the disks associated with the switches H1–0 through H1–9 in locations to cause one of said switches to be closed at all times, the digit value assigned to that switch corresponding to the first order hour digit of a time reading reflected by the angular position of the drum. Thus, as shown in FIG. 13a, three dogs 86 are located on a disk 38 associated with the switch H1–0, so that that particular switch will be actuated and closed three times during the course of one day and when the hour value of a time reading is 0, 10, or 20. In like manner as shown in FIG. 13b, three dogs are provided on the disk 38 associated with the switch H1–1, those dogs being located in notches which will result in actuation of a switch when the angular position of the drum 36 represents an hour time reading of 1, 11, or 21. FIG. 13c further illustrates that for the switch H1–9, two dogs 86 are disposed on the disk 38 associated therewith, those dogs being placed in slots corresponding to time readings of 9 hours and 19 hours. By this system, therefore, one of the third group of switches H1–0—H1–9 will always be closed, and the digit value assigned to that switch will correspond to the first order digit of the hour time reading.

Figure 14A:
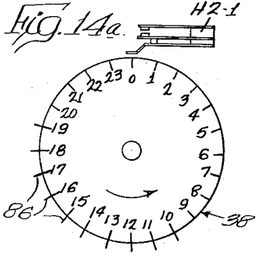
FIGS. 14a–14b illustrate the locations of switch-actuating dogs on exemplary disks of the drum assembly for controlling the hours-tens switches.
Figure 14B:
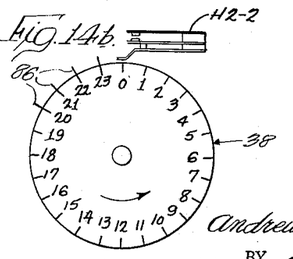

The fourth group of switches, including the switches H2–1 and H2–2, are associated with the last two disks 38 on the hour drum 36. Means are provided to actuate the first switch during the second ten hour period and the second switch during the last four hours of each twenty-four hour interval. To do this, dogs are located at angular positions on these disks such that the switch H2–1 will be actuated and closed when the second order digit of an hour time expression has the value of "1." Thus, as shown in FIG. 14a, dogs 86 are located in radial slots of the disk such that they will close switch H2–1 when the angular position of the drum 36 corresponds to any hour value between "10" and "19." Similarly, four dogs 86 are provided on the disk 38 associated with the switch H2–2, and located in those radial slots such that the switch to be closed when the time reading in hours has a value between "20" and "23," i.e., when the second order hour digit has the value of "2."

In accordance with the invention, relatively simple circuits are provided to light different combinations of the lamps in the display panels 25–28 to display the time reading represented by the particular switches which are closed at any given instant. Control of a great number of lamps by a relatively small number of switches is accomplished by selecting matrices which include a plurality of unidirectionally conductive devices interconnecting the switches for each panel with the lamps in that panel.

Figure 15A:
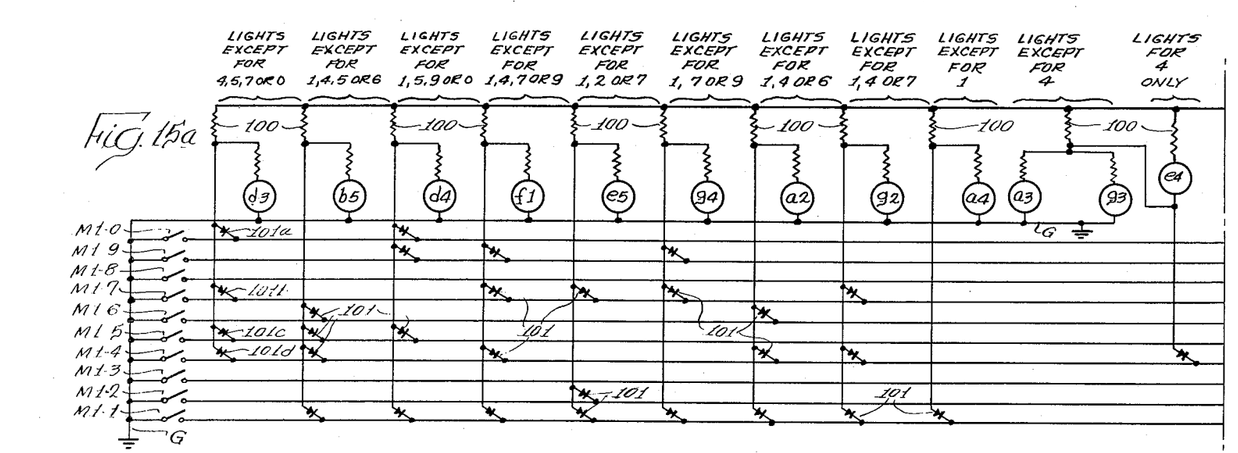
FIGS. 15a and 15b, when joined along the indicated junction lines, constitute a schematic wiring diagram of an electric circuit for controlling the lighting of lamps in the minutes-units or the hours-units display panels.
Figure 15B:
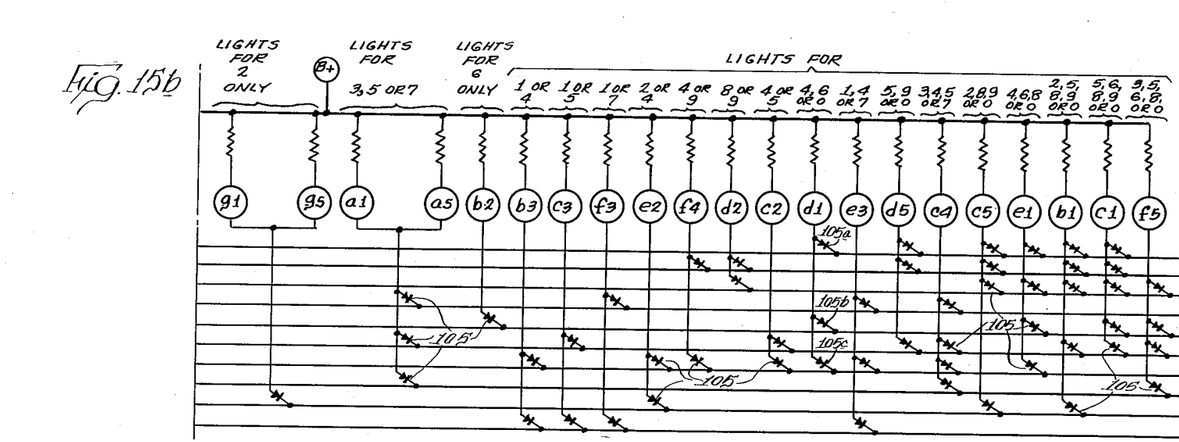

The matrix circuit connected between the minutes-units display panel 25 and the switches M1–0 through M1–9 is shown in FIGS. 15a and 15b. It includes means for normally energizing certain ones of the lamps in a display panel, such means here being illustrated as a first plurality of resistors 100 respectively connecting the lamps d3, b5, d4, f1, e5, g4, a2, g2, a4, and a3 and g3 across a direct voltage source here represented conventionally by a B+ terminal and a ground bus G. Each of the foregoing lamps has connected in series therewith a current limiting resistor since in the preferred form the lamps are neon bulbs which have a greatly reduced resistance once ionization has occurred. It will be seen, therefore, that each of the certain ones of the lamps enumerated above will normally be connected directly across a direct voltage source and will therefore normally be lighted.

To selectively control the deenergization of these lamps, a first plurality of diodes 101 are interconnected, as shown, in series with different ones of the switches M1–0 through M1–9 and in parallel across different respective ones of the lamps and their associated current limiting resistors. If, by way of example, the switch M1–0 is closed, the particular diode 101a will be placed in series with the switch M1–0, the two being in parallel across the lamp d3 and its associated current limiting resistor. Accordingly, current will flow directly from the B+ terminal through the resistor 100 associated with the lamp d3, through the diode 100a, and through the closed switch M1–0 to ground, the lamp d3 and its associated current limiting resistor being shunted so as to extinguish that particular lamp. In like manner, it will be seen that if the switches M1–7, M1–5 or M1–4 are closed, the particular diodes 101b, 101c or 101d will be conductive to shunt and deenergize the lamp d3. In this manner, the connections shown in FIGS. 15a and 15b operate to cause the lamp d3 to be lighted except when the switches assigned the digit values of "4," "5," "7" or "0" are actuated, as labeled. From this, it will be seen that the remaining diodes 101 are associated with the remaining normally energized lamps to cause the latter to be lighted except when a particular one of different combinations of the switches are closed, as labeled at the top of FIG. 15a.

In addition, the matrix circuit of FIGS. 15a and 15b includes a second plurality of diodes 105 together with means connecting them in series with certain others of the lamps in the display panel 25 through different combinations of the switches M1–0 through M1–9. Thus, the lamps e4, g1, g5, a1, a5, b2, b3, c3, f3, a2, f4, d2, c2, d1, e3, d5, c4, c5, e1, b1, c1, and f5 as shown in FIGS 15a and 15b are all normally deenergized. However, each of these lamps is connected to the B+ terminal through the current limiting resistor, and hence through one or more of the diodes 105 and one or more of the switches M1–0—M1–9. Therefore, when one of these switches is closed, a current conduction path will be established through a diode 105 and the closed switch to energize and light one or more associated lamps. Considering the lamp d1, for example, it is connected in series with the B+ terminal through the particular diodes 105a, 105b or 105c and the corresponding switches M1–0, M1–4, M1–6 to the ground bus G. Thus, when the switch M1–0 is closed current will flow through the lamp d1 and the diode 105a to ground, lighting that lamp. Alternatively, when switches M1–4 or M1–6 are closed, current will flow through the diodes 105c or 105b, thus energizing the lamp d1. By the particular arrangement of diodes 105 illustrated in FIGS. 15a and 15b, each of the second group of lamps, previously enumerated, will be energized when any one of different sub-combinations of switches M1–0—M1–9 are closed, the switches which must be closed in order to energize the different ones of these lamps being labeled immediately at the upper portion of FIGS. 15a and 15b.

Without reciting and specifically describing the particular connections for each of the diodes 101 and 105, it will be clear from FIGS. 15a and 15b that when any one of the switches M1–0—M1–9 are closed, the thirty-three lamps illustrated in the wiring diagram will be energized and deenergized in combinations to display the corresponding numeral. For example, when the switch M1–3 is closed the first eleven lamps reading inwardly from left side of FIG. 15a will all be energized, since no shunting action can take place through one of the diodes 101. On the other hand, the lamp e4 will be deenergized since no current conduction path is established therefor, and the same is true of the lamps g1, g5, b2, b3, c3, f3, e2, f4, b2, c2, d1, e3, d5, c5, e1, b1, and c1. It will be apparent that three diodes 105 connect with the M1–3 switch so that a current conduction path will be established for the lamps a1, a5, c4, and f5. Therefore, the particular combination of the thirty-three lamps required to display the number "3" as shown in FIG. 3 will be energized and the remaining lamps deenergized whenever the switch M1–3 is closed.

By the similar analysis it will be apparent that the lamps in the display panel 25 will be energized in the unique combinations required to display the respective numerals 0–9 whenever the switches M1–0 through M1–9 respectively, are closed.

The thirty-three lamps are arranged in the hours-units display panel 27 in exactly the same locations as the lamps in the minutes-units of display panel 25, and the lamps in the display panel 27 are also to be controlled by selective closure of different ones of a group of ten switches, namely, the hours-units switches H1–0 through H1–9. Therefore, it will be understood that the matrix circuit interconnecting the hours-units switches H1–0 through H1–9 and the lamps in the display panel 27 may be organized identically and operate in exactly the same way as the circuit previously described in FIGS. 15a and 15b. The only difference would be that the switches M1–0 and M1–9 shown in FIG. 15a would be replaced by the switches H1–0 through H1–9, and the lamps connected in the circuit would be lamps in the hours-units display panel 27, rather than the lamps in the minutes-units display panel 25.

Figure 16A:
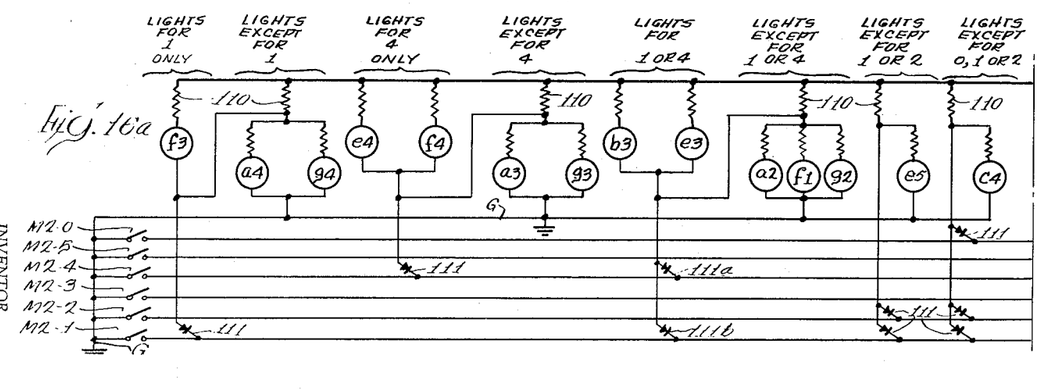
FIGS. 16a and 16b, when joined along the indicated junction lines, are a schematic circuit diagram of an electric circuit for controlling the lighting of lamps in the minutes-tens display panel.
Figure 16B:
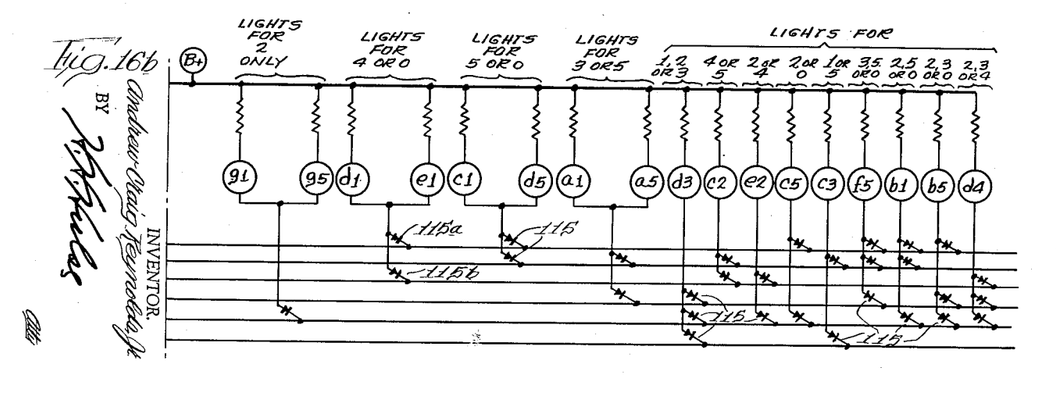

For controlling the energization of the thirty-one lamps in the display panel 26 in order to display any numeral 0 through 5, a matrix circuit such as illustrated in FIGS. 16a and 16b is interconnected between those lamps and the minutes-tens switches M2–0 through M2–5. This circuit includes a first plurality of resistors 110 which connect certain ones of the lamps (namely, lamps a4, g4, a3, d3, a1, f2, g2, e5, and c4) directly between the positive or B+ terminal of a direct voltage source and a ground bus G. Those certain lamps are, therefore, normally energized. However, a first plurality of unidirectionally conductive devices or diodes 111 are connected to different ones of the switches M2–0 to M2–5 in parallel with those lamps and their associated current limiting resistors so that the lamps are deenergized in response to closure of different ones of the switches.

For example, taking the lamps a2, f1 and g2 which are identically controlled as illustrated in FIG. 16a, they are normally energized by current flow from the B+ terminal through the associated resistor 110, and through the lamps in parallel to the ground bus G. However, if either the switch M2–4 or M2–1 is closed, then the particular diodes 111a or 111b will conduct to shunt those particular lamps so that they will be deenergiedz.

Also, it will be seen in FIGS. 16a and 16b that certain others of the lamps in the display panel 26 are normally deenergized, and that different groups of diodes 115 serve to connect the lamps f3, e4, f4, b3, e3, g1, g5, d1, e1, c1, d5, a1, a5, d3, c2, e2, c5, c3, f5, b1, b5, and d4 in series across the voltage source only when particular ones of the switches are closed. Taking the lamps d1 and e1 illustrated in FIG. 16b, by way of example, these lamps are connected in parallel from the B+ terminal through particular diodes 115a and 115b and respective switches M2–0 and M2–4 to the ground bus G. Therefore, if either the switch M2–0 or M2–4 is closed, the diode 115a or the diode 115b will be rendered conductive to permit current flow through the lamps d1 and e1, lighting the same.

From an inspection of FIGS. 16a and 16b it will be clear that in response to individual closure of the different switches M2–0—M2–5, the 31 lamps in the minutes-tens display panel 26 will be lighted in different combinations (FIG. 3) to display the corresponding numerals 0 through 5.

An important function of the diodes illustrated in FIGS. 15a, 15b and FIGS. 16a, 16b is that they permit a single switch to establish a plurality of conductive paths through those diodes when that switch is closed. However, since the diodes can conduct appreciable current only in the direction of the symbolic arrows, closure of a particular one of the switches cannot result in illumination or shunting of lamps intended to be lighted or shunted when other switches are closed. For example, if the diode 115b in FIG. 16b were not unidirectional, in its conducting capabilities, closure of the switch M2–0 would place at ground potential the line extending from the switch M2–4 and thus create, for example, a current flow path through the lamp c2 and diode associated therewith to ground, causing energization of the lamp c2 as well as the lamps c1 and e1 in response to the closure of M2–0 switch. Since it is desired to energize the lamp c2 only if the switches M2–4 or M2–5 are closed, the unidirectionally conductive characteristics of the diode 115b prevent the circuit association of the lamps d, e1 with the switch M2–4 from effecting energization of other lamps when the switch M2–0 is closed.

Figure 17:
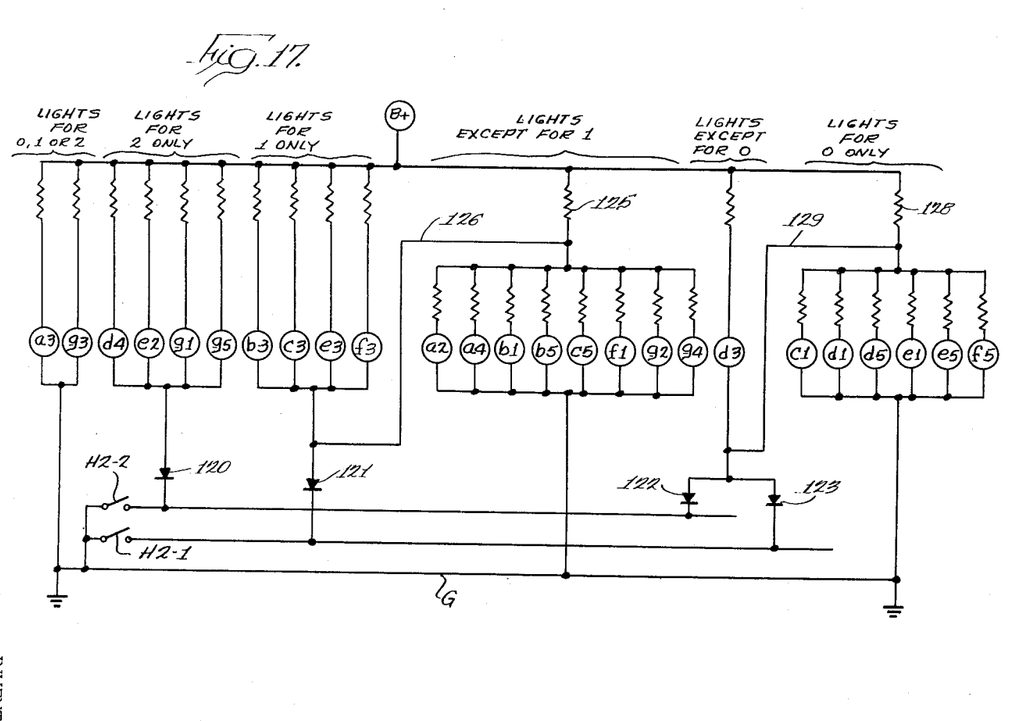
FIG. 17 is a schematic wiring diagram of an electric circuit for controlling the lighting of lamps in the hours-tens display panel.

The diode matrix circuit interposed between the lamps in the hours-tens display panel 28 and the hours-tens switches H2–2 and H2–1 is illustrated by FIG. 17. It will be seen that there is provided means for energizing the lamps a3 and g3 regardless of the conditions of the two switches, since these are connected directly through current limiting resistors between the B+ terminal of a direct voltage source and a ground bus G. In order to display any of the numerals, 0, 1 or 2, these two lamps a3 and g3 are always energized (FIG. 4).

Additionally, means including a first diode 120 are established for energizing the lamps d4, e2, g1 and g5 whenever the switch H2–2 is closed, such means here shown as simply a direct connection of the four lamps from the B+ terminal in parallel, thence through the diode 120 and the switch H2–2 to ground. Additionally, means including a second diode 121 are provided for energizing the lamps b3, c3, e3 and f3 whenever the switch H2–1 is closed, such means comprising a direct connection of those lamps in parallel through current limiting resistors, the diode 121 and the switch H2–1 to ground. Finally, third and fourth diodes 122, and 123, are provided for energizing the lamp d3 whenever either one of the two switches H2–2, H2–1 is closed. Such means are here shown as a direct connection of the lamp d3 and its current limiting resistor to the B+ terminal, and thence in parallel through the two diodes 122, 123 and the respective switches H2–2 and H2–1. It will thus be apparent that when neither of the switches is closed the lamp d3 will be deenergized, as is required (FIG. 4) for the display of the "0" character. Still further, means are provided including a first resistor 125 for normally energizing the lamps a1, a4, b1, b5, c5, f1, g2, g4, the lamps and their current limiting resistors being connected in parallel and thence directly between the B+ terminal and the ground bus G by the resistor 125. To deenergize those lamps whenever the H2–1 switch is actuated, a connection 126 is made through the second diode 121 and the switch H2–1 in parallel with the lamps, so that the lamps will be shunted whenever the switch H2–1 is closed.

Additionally, a second resistor 128 is employed to directly connect a parallel group of lamps c1, d1, b5, e1, e5, and f5 between the B+ terminal and ground so that such lamps are normally energized. However, means are provided to shunt and deenergize those lamps except when both of the switches H2–2 and H2–1 are opened, indicating that the character "0" is to be displayed. For this purpose a connection is made by the line 129 to place both the series combinations of the diode 122 and the switch H2–2, and the diode 123 and the switch H2–1 in parallel with the lamps. Thus, whenever either one of the switches is closed, a shunting circuit through a corresponding one of the diodes 122 or 123 will be established and the lamps will accordingly be deenergized.

A brief inspection of FIG. 17 taken with FIGS. 3 and 4 will show that whenever neither of the switches H2–1 and H2–2 is closed, the particular combination of lamps will be energized as required to display the "0" character on the panel 28. On the other hand, if the switch H2–1 is closed, then a unique combination of the lamps required to display "1" will be energized; and in like manner if the switch H2–2 is closed, a unique combination of the lamps will be energized to display the numeral "2."

From the foregoing, it will be seen that there has been provided here an electrically lighted, direct reading display clock which numerically indicates time from minute to minute as measured off by a horologic device. Of particular significance is the fact that only twenty-eight switches are required in order to properly energize different combinations of lamps in display panels in order to indicate the proper numerals. Because such a small number of switches is required, the drum and switch assembly depicted in FIG. 5 can be made extremely small and compact, and each of the switches may be made especially reliable in its construction. Thus, a very simply organized, compact, reliable and relatively inexpensive arrangement is here provided to effect a lighted, numerical, direct reading clock.

I claim:

1. A lighted time-display clock comprising in combination, a plurality of switches, means including a horologic device for successively actuating different sub-pluralities of said switches according to the value of numerically expressed time, a plurality of lamps physically arranged such that different numbers may be displayed upon energization of different combinations of the lamps, electric circuits interconnecting said switches and said lamps, said circuits including means for normally energizing a first sub-plurality of said lamps, a first plurality of unidirectionally conductive devices connected to shunt different combinations of the lamps in said first sub-plurality in response to actuation of different ones of said switches, means partially establishing energization paths for each of a second sub-plurality of said lamps but leaving the latter normally deenergized, a second plurality of unidirectionally conductive devices connected to complete said paths in different combinations and to energize the lamps of said second sub-plurality in different combinations in response to actuation of different ones of said switches, so that said lamps give a lighted display of the numerical time expression represented by actuation of that sub-plurality of switches.

2. A lighted time-display clock comprising, in combination, four groups of switches in which each group is assigned to one order of two two-order numerical time expressions and in which each switch within one group is assigned to a different digit value for the group order, means including a horologic device for successively actuating one switch in each of said groups according to the value of passing time, four display panels each having a plurality of lamps physically arranged to display numerical digits upon energization of different combinations of the lamps, four electric circuits interconnecting the switches in respective ones of said groups with the lamps in corresponding ones of said panels; each of said circuits having means for normally energizing a first sub-plurality of the corresponding plurality of said lamps, means including a first plurality of unidirectionally conductive devices connected to shunt different combinations of the lamps in said first sub-plurality in response to actuation of different ones of the corresponding group of switches, means partially establishing energization paths for a second sub-plurality of the corresponding plurality of said lamps but leaving the latter normally deenergized, means including a second plurality of unidirectionally conductive devices connected to complete different combinations of said paths and to energize the lamps in said second sub-plurality in different combinations in response to actuation of different ones of the corresponding group of said switches, so that closure of a switch in one of said switch groups causes deenergization of some of said normally energized lamps and energization of some of said normally deenergized lamps to make a unique combination of the corresponding plurality of lamps be lighted.

3. A lighted time-display clock comprising, in combination, first and second drums, a solenoid ratchet device for stepping said first drum, a horologic device having means to supply one current pulse per minute to said solenoid device to turn said first drum one revolution per hour, step-down gear means for driving said second drum from the first at one revolution per day, a display board having four display panels respectively providing a display of first and second order minutes digits and first and second order hours digits, each of said display panels having a plurality of lamps arranged in a two dimensional grid pattern, first and second sets of ten and six switches, respectively, means on said first drum for selectively actuating one switch in each of said first and second sets according to the angular position of said first drum, third and fourth sets of ten and two switches, respectively, means on said second drum for selectively actuating one switch in each of said third and fourth sets according to the angular position of said second drum, four matrix circuits each including one of said sets of switches and the plurality of lamps of a corresponding one of said display panels, each said matrix circuit having means for energizing a first sub-plurality of the associated lamps, means including a plurality of unidirectionally conductive devices for shunting and deenergizing different combinations of the lamps in said first sub-plurality in response to actuation of different ones of the associated set of switches, means for partially establishing energization paths for a second sub-plurality of the associated lamps, and means including a second plurality of unidirectionally conductive devices for completing said paths to energize different combinations of lamps in said second sub-plurality in response to actuation of different ones of the associated set of switches.

4. A lighted time-display clock comprising, in combination, first and second drums, means for turning said drums at one revolution per hour and one revolution per day, respectively, a group of ten "minutes-units" switches assigned the digit values 0–9 and means on said first drum for successively closing such switches during each minute of each successive ten-minute interval, a group of six "minutes-tens" switches assigned the digit values 0–5 and means on said first drum for successively closing a different one of such switches during each ten minute interval of each successive hour, a group of ten "hours-units" switches assigned the digit values 0–9 and means on said second drum for successively closing a different one of such switches during each hour of two successive ten hour intervals and for respectively closing the first four of such switches during each hour of the succeeding four hour interval, a group of two "hours-tens" switches assigned the digit values 1 and 2 and means on said second drum for closing the first such switch during the second ten hour period and the second such switch during the last four hour period of each twenty four hour interval, four digit display panels each having a plurality of electric lamps disposed in predetermined positions of a rectangular grid pattern to display when illuminated in different combinations the digits 0–9, 0–5, 0–9, and 0–2, respectively, four matrix circuits each having a respective one of said groups of switches and the said lamps of the corresponding one of said panels connected therein, each of said matrix circuits including means for energizing a first sub-plurality of the associated lamps, means including a plurality of unidirectionally conductive devices for shunting and deenergizing different combinations of the lamps in said first sub-plurality in response to actuation of different ones of the associated group of switches, means for partially establishing energization paths for a second sub-plurality of the associated lamps, and means including a second plurality of unidirectionally conductive devices for completing said paths to energize different combinations of lamps in said second sub-plurality in response to actuation of different ones of the associated group of switches.

5. A lighted time-display clock comprising, in combination, first and second rotatable drums, a horologic device and means controlled thereby for turning said first drum at one revolution per hour, speed reduction means interposed between said first and second drums for turning the latter at one revolution per day, a group of ten "minutes-units" switches respectively assigned the digit values of 0–9, means on said first drum for individually actuating different ones of said ten "minutes-units" switches when the drum is in angular positions indicative of a time minute value of the first decimal order of 0–9, respectively, a group of six "minutes-tens" switches respectively assigned the digit values of 0–5, means on said first drum for individually actuating different ones of said "minutes-tens" switches when the drum is in angular positions indicative of a time minute value of the second decimal order of 0–5, respectively, a group of ten "hours-units" switches respectively assigned the digit values 0–9, means on said second drum for individually actuating different ones of said "hours-units" switches when the drum is in angular positions indicative of time hour values of the first decimal order of 0–9, respectively, a group of two "hours-tens" switches assigned the digit values 1 and 2, means on said second drum for individually actuating said switches when such drum is in angular positions indicative of time hour values of the second decimal order of 1 and 2, respectively, four display panels each having a plurality of lamps arranged in a two-dimensional grid pattern to selectively display when illuminated in different combinations the digits 0–9, 0–5, 0–9 and 0–2, respectively, four matrix circuits each having a respective one of said four groups of switches and the lamps of a corresponding one of said panels connected therein, each of said matrix circuits including means for energizing a first sub-plurality of the associated lamps, means including a plurality of unidirectionally conductive devices for shunting and deenergizing different combinations of the lamps in said first sub-plurality in response to actuation of different ones of the associated group of switches, means for partially establishing energization paths for a second sub-plurality of the associated lamps, and means including a second plurality of unidirectionally conductive devices for completing said paths to energize different combinations of lamps in said second sub-plurality in response to actuation of different ones of the associated group of switches.

6. In a lighted, direct reading time-display clock, the combination comprising a plurality of switches assigned successive digit values, means including a horologic device for successively actuating individual ones of said switches at regular intervals over succeeding time periods so that the particular switch is closed represents one digit of a numerical time expression, a display panel having a plurality of lamps positioned so that energization of different combinations of the lamps gives a lighted display of corresponding digits, a selecting circuit interconnecting said switches and said lamps, said circuit having means for normally energizing a first sub-plurality of said lamps, means including a first plurality of unidirectionally conductive devices connected to shunt different combinations of the lamps in said first sub-plurality in response to actuation of different ones of said switches, means partially establishing energization paths for a second sub-plurality of said lamps but leaving the latter normally deenergized, means including a second plurality of unidirectionally conductive devices connected to energize different combinations of the lamps in said second sub-plurality in response to actuation of different ones of said switches.

7. In a lighted time-display clock, the combination comprising a group of ten switches assigned the digit values 0–9, respectively, means for individually closing each of said switches when a predetermined digit place of numerically expressed time has the corresponding value, a display panel having a grid-like pattern, a plurality of lamps disposed in the grid pattern of said panel to display the numerals 0–9 when lighted in different predetermined combinations, a matrix circuit including a plurality of resistors and means for connecting them in series with certain ones of said lamps across a direct voltage source so that such lamps are normally illuminated, a first plurality of diodes and means connecting each of them across one of said certain lamps in series with a switch corresponding to a digit which is displayed by said panel when that particular lamp is not illuminated, a second plurality of diodes and means connecting each of them in series with one of certain others of said lamps and with switches corresponding to a digit which is displayed by said panel when those particular lamps are illuminated.

8. In a lighted time-display clock, the combination comprising a group of six switches assigned the digit values 0–5, respectively, means including a horologic device for individually closing respectives ones of said switches when the second order digit of numerically expressed minutes time between 0 and 59 minutes has the value of 0–5, a display panel having a grid-like pattern, a plurality of lamps disposed in said panel pattern to display the digits 0–5 when lighted in six predetermined combinations, a matrix circuit including a plurality of resistors and means for connecting them in series with certain ones of said lamps across a direct voltage source, a first plurality of diodes and means connecting each of them across one of said certain lamps in series with a switch assigned to a digit which is displayed by said panel when that particular lamp is not illuminated, each of said first plurality of diodes being poled to conduct and shunt the associated lamp when the associated switch is closed, a second plurality of diodes and means for connecting each of them in series with one of certain others of said lamps and with switches assigned to digits which are displayed by said panel when those particular lamps are lighted, said second plurality of diodes being poled to conduct and energize the associated lamp when the associated switch is closed.

9. In a lighted time-display clock, the combination comprising two switches assigned the digit values of 1 and 2, respectively, means including a horologic device for individually closing said switches when the second order digit of a numerically expressed hours time between 0 and 24 has the value of 1 or 2, respectively, a display panel having a grid-like pattern, a plurality of lamps disposed in the pattern of said panel to display the numerals 0–2 when lighted in three respective predetermined combinations, a circuit including means for energizing a first selected sub-plurality of the lamps which are lighted in the 0–2 combinations regardless of the condition of said switches, means including a first diode for connecting a second selected sub-plurality of the lamps across a direct voltage source through said "2" switch to energize those lamps only when that switch is closed, means including a second diode for connecting a third selected sub-plurality of the lamps across said source through said "1" switch to energize those lamps only when that switch is closed, means including third and fourth diodes for connecting a fourth selected sub-plurality of the lamps in series with either of said switches so that such lamps are energized if either switch is closed, means including a first series resistor for connecting a fifth selected sub-plurality of the lamps across said source to normally energize such lamps, means including said second diode and said "1" switch connected in parallel with the fifth sub-plurality of lamps to shunt and deenergize the same when that switch is closed, means including a second series resistor for connecting a sixth selected sub-plurality of the lamps across said source to normally energize such lamps, and means including said third and fourth diodes for individually connecting said switches in parallel with said sixth sub-plurality of lamps to shunt and deenergize the latter when either of said switches is closed.

10. A lighted time-display clock comprising, in combination, first and second drums, means for turning said drums at one revolution per hour and one revolution per day, a display board having four display panels respectively providing a display of first and second order minutes digits and first and second order hours digits, each of said display panels having a plurality of lamps arranged in a two dimensional grid pattern, first and second sets of ten and six switches, respectively, means on said first drum for selectively actuating one switch in each of said first and second sets according to the angular position of said first drum, third and fourth sets of ten and two switches, respectively, means on said second drum for selectively actuating one switch in each of said third and fourth sets according to the angular position of said second drum, four matrix circuits each including one of said sets of switches and the plurality of lamps of a corresponding one of said display panels, each said matrix circuit having means for energizing a first sub-plurality of the associated lamps, means including a plurality of unidirectionally conductive devices for shunting and de-energizing different combinations of the lamps in said first sub-plurality in response to actuation of different ones of the associated set of switches, means for partially establishing energization paths for a second sub-plurality of the associated lamps, and means including a second plurality of unidirectionally conductive devices for completing said paths to energize different combinations of lamps in said second sub-plurality in response to actuation of different ones of the associated set of switches.

11. A time-display clock comprising, in combination, first and second switch actuating means, means for cyclically driving said first and second switch actuating means at timed rates, a display board having four display panels respectively providing a display of the first and second order minutes digits and first and second order hours digits, each of said display panels having a plurality of electrically actuated indicators arranged in a two dimensional grid pattern, each of said indicators having an On and an Off condition, first and second sets of ten and six switches, respectively, said first switch actuating means adapted to actuate one switch in said first set each minute of time and one switch in said second set each ten minutes of time, a third set of ten switches and a fourth set of at least one switch, respectively, said second switch actuating means adapted to actuate one switch in said third set each hour of time and one switch in said fourth set at the expiration of ten hours of time, four matrix circuits each including one of said sets of switches and the plurality of indicators of a corresponding one of said display panels, each said matrix circuit having means for placing a first plurality of its associated indicators in the On condition, means including a plurality of unidirectionally conductive devices for shunting and placing in the Off condition different combinations of the indicators in said first sub-plurality in response to actuation of different ones of the associated set of switches, means for partially establishing energization paths for a second sub-plurality of the associated indicators and means including a second plurality of unidirectionally conductive devices for completing said paths to place in the On condition, different combinations of indicators in said second sub-plurality in response to actuation of different ones of the associated set of switches.

12. A character display device comprising, in combination, a plurality of electrically actuated visual indicators each having visibly apparent energized and de-energized conditions, said indicators organized into a two-dimensional character display grid, a plurality of two condition switches each corresponding to a particular character that may be displayed, each of said switches normally being in a first condition and when operated being in a second condition, a first class of said indicators being normally de-energized when none of said switches are operated, the remainder of said indicators comprising a normally energized second class when none of said switches are operated, a plurality of unidirectionally conductive devices, a plurality of circuit means permanently connecting said indicators, said switches and said unidirectionally conductive devices in circuit to a source of energization, the energization of each of said circuit means controlled by the condition of one of said switches, circuits established by at least one of said circuit means when its controlling switch is operated, said circuits being established through at least one of said unidirectionally conductive devices to energize preselected indicators in said normally de-energized first class, and further means simultaneously controlled by the operation of said operated switch to de-energize preselected indicators in said normally energized second class whereby the particular character corresponding to the operated switch is displayed.

13. The combination defined in claim 12 wherein preselected indicators of said first class are only energized for preselected characters and for no other characters, and a common circuit through one of said unidirectionally conductive devices permanently connecting said preselected indicators to a preselected switch, whereby one of said preselected characters is displayed when said preselected switch is operated.

14. A character display device comprising in combination, a plurality of electrically actuated visual indicators having visibly apparent energized and de-energized conditions, said indicators organized into a two-dimensional character display grid, a plurality of two condition switches each corresponding to a particular character that may be displayed, each of said switches normally being in a first condition and when operated being in a second condition, a first class of said indicators being normally de-energized when none of said switches are operated, the remainder of said indicators comprising a normally energized second class when none of said switches are operated, a plurality of unidirectionally conductive devices, a plurality of circuit means for permanently connecting said indicators, said switches and said unidirectionally conductive devices in circuit to a source of energization, each of said circuit means controlled by the condition of one of said switches, circuits established by at least one of said circuit means when its controlling switch is operated, said circuits being established through at least one of said unidirectionally conductive devices to energize preselected indicators in said normally de-energized first class and shunt circuits simultaneously established by said one circuit means when its controlling switch is operated, said shunt circuits being established through at least one of said unidirectionally conductive devices to de-energize preselected indicators in said normally energized second class, whereby the particular character corresponding to the operated switch is displayed.

15. The combination defined in claim 14 wherein first preselected indicators of said first class are only energized for first preselected characters and for no other characters, and a common circuit through one of said unidirectionally conductive devices permanently connecting said first preselected indicators to a first preselected switch, whereby one of said first preselected characters is displayed when said first preselected switch is operated.

16. The combination defined in claim 15 wherein second preselected indicators of said second class are only de-energized for second preselected characters and for no other characters and a common shunt circuit permanently connected through one of said unidirectionally conductive devices to a second preselected switch to de-energize said second preselected indicators, whereby one of said second preselected characters is displayed when said second preselected switch is operated.

17. The combination defined in claim 16 wherein said first and second preselected characters are identical, and said common circuit and said common shunt circuit are permanently connected through the same unidirectionally conductive device to the same preselected switch.

18. The combination defined in claim 17 wherein said first class comprises substantially all indicators which are de-energized for more than one-half of the characters which may be displayed, and said second class comprises substantially all indicators which are energized for more than one-half of the characters which may be displayed.

19. The combination defined in claim 14 wherein preselected indicators of said second class are only de-energized for preselected characters and for no other characters and a common shunt circuit permanently connected through one of said unidirectionally conductive devices to a preselected switch to de-energize said preselected indicators, whereby one of said preselected characters is displayed when said second preselected switch is operated.

20. A character display device comprising, in combination, a plurality of electrically actuated visual indicators each having visibly apparent energized and deenergized conditions, said indicators organized into a character display grid, each of said indicators having a first and a second energization terminal, first and second source terminals adapted for connection to a source of electricity, the first energization terminals of a first group of said indicators permanently connected in circuit to said first source terminal, the first and second energization terminals of the remaining and second group of said indicators being permanently connected in circuit to said first and second source terminals respectively, a plurality of two terminal switches each corresponding to a particular character to be displayed, a first terminal of each of said switches permanently connected in circuit to said second source terminal, a plurality of unidirectionally conductive devices, the second energization terminal of each of said first group of indicators permanently connected in circuit to the second terminals of selected switches through unidirectionally conductive devices, and the first energization terminals of each of said second group of indicators permanently connected in circuit to the second terminals of selected switches through unidirectionally conductive devices, whereby a character may be displayed by closing its corresponding switch.

References Cited in the file of this patent

UNITED STATES PATENTS

| 1,220,109 | Heiny | Mar. 20, 1917 |
| 2,039,920 | Moore | May 5, 1936 |
| 2,359,014 | Ward | Sept. 26, 1944 |
| 2,673,976 | Williams et al. | Mar. 30, 1954 |

FOREIGN PATENTS

| 472,483 | Italy | June 20, 1952 |

OTHER REFERENCES

"Rectifier Networks for Multiposition Switching," an article appearing in the February 1949 issue of "Proceedings of the I.R.E." on pages 139–147.